United States Patent Office 3,198,607
Patented Aug. 3, 1965

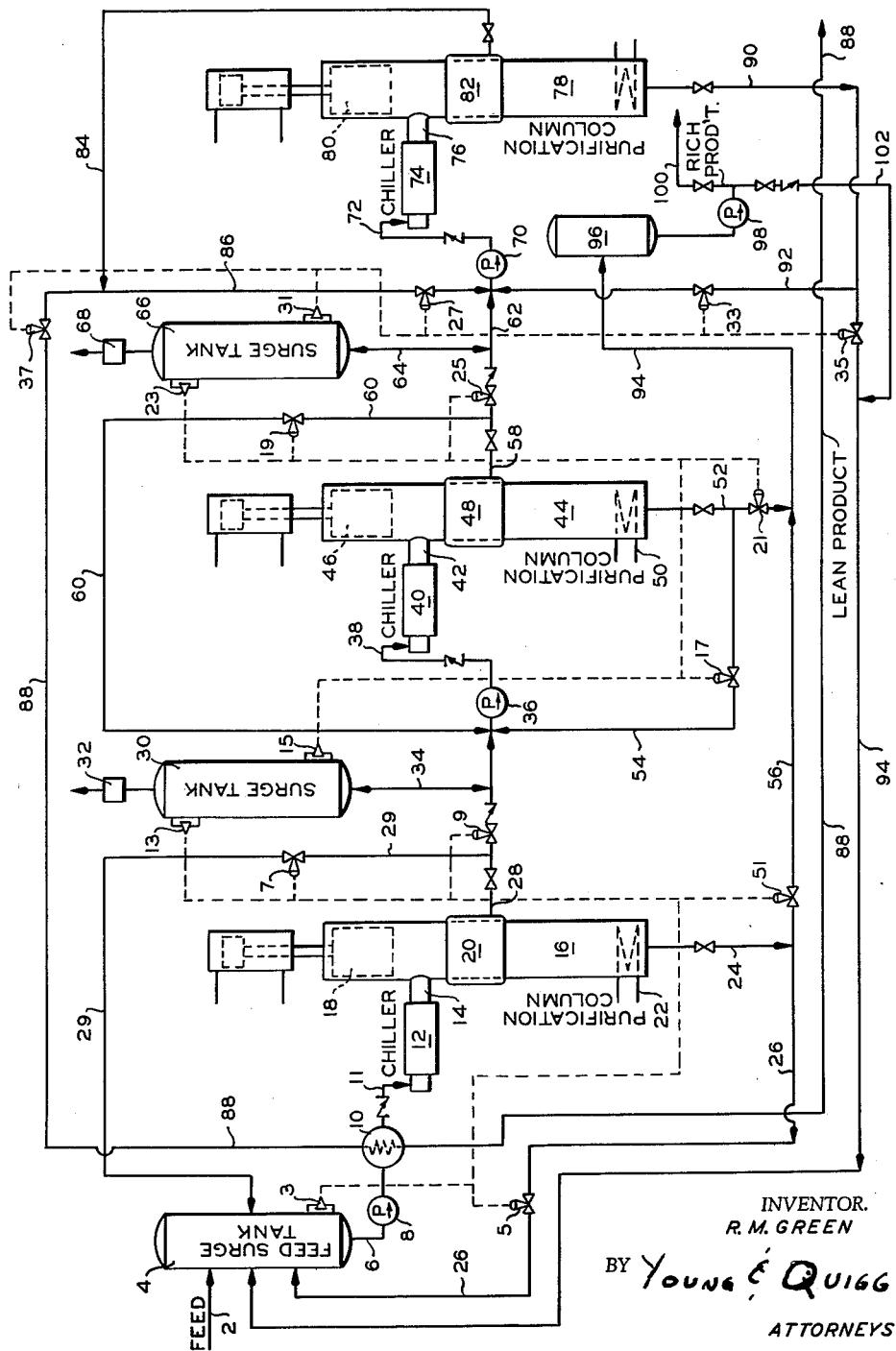

3,198,607
FRACTIONAL CRYSTALLIZATION APPARATUS
INCLUDING RECYCLE CONTROL
Richard M. Green, Borger, Tex., assignor to Phillips
Petroleum Company, a corporation of Delaware
Original application Apr. 2, 1957, Ser. No. 650,256, now
Patent No. 3,082,211, dated Mar. 19, 1963. Divided
and this application Oct. 8, 1962, Ser. No. 228,890
5 Claims. (Cl. 23—273)

This application is a division of my copending application Serial No. 650,256, filed April 2, 1957, and issued as U.S. Patent No. 3,082,211 on March 19, 1963.

This invention relates to method and apparatus for recovering a crystallizable material from a liquid multicomponent mixture. In one aspect it relates to method and apparatus for providing continuous onstream operation of two or more crystallization and purification steps in series.

In many instances when carrying out separation by crystallization, product purification is improved by providing crystallization and purification in a series of steps or stages. One disadvantage, however, of operating stagewise is that of maintaining continuous operation in the face of equipment malfunctioning which may occur, particularly when the crystallization and purification process is carried out at below normal atmospheric temperatures. An important aspect of the crystallization and purification process involves separation of crystals from mother liquor this usually being accomplished by filtration, such as on a rotary filter or in a filter column. Considerable time and effort is devoted to obtaining and maintaining a suitable filter cake since the rate of filtration usually is a governing factor in the quantity of material which can be processed in the unit. If for any reason the feed slurry to the filter is interrupted, the filter cake is quickly destroyed and a considerable amount of time may be required after operation is resumed before a suitable cake is obtained. Thus it is desirable to provide a process in which continuous operation of the filter is provided.

It is an object of this invention to provide an improved process for recovering a crystallizable material from a liquid multicomponent mixture.

Another object of this invention is to provide improved processes and apparatus for crytallizing and purifying a crystallizable material in a series of stages.

Still another object of this invention is to provide an improved process and apparatus for maintaining continuous operation in a multistage crystallization and purification process.

Yet another object of this invention is to provide an improved process and apparatus for maintaining continuous feed to the crystal purifiers in a multistage crystallization and purification process.

These and other objects of the invention will become more readily apparent from the following detailed description and discussion.

The foregoing objects are achieved broadly in a multistage crystallization process by providing surge capacity preceding each crystallization and purification stage and providing instrumentation to automatically switch the stages between production and total recycle to maintain the level in each surge tank between a predetermined minimum and maximum.

In one aspect the invention comprises operating each stage of a crystallization and purification process so that operation is switched from production to total recycle when the material in the surge tank following said stage exceeds a predetermined maximum level or when the material in the surge tank preceding said stage drops below a predetermined minimum level.

The process and apparatus of this invention are applicable to a vast number of simple binary and complex multicomponent systems. The invention is particularly applicable to the separation of hydrocarbons which have practically the same boiling points, and are, therefore, difficult to separate by distillation. When high boiling organic compounds are concerned, separation by distillation is often undesirable because many such compounds are unstable at high temperatures. Specific examples of organic systems to which this invention is applicable are recited in U.S. Patent 2,747,001 and of particular importance, there may be mentioned separation of systems containing xylenes, systems containing cyclohexane, systems containing normal paraffins, and systems containing benzene, and the like. Thus, it has been found that paraxylene can be separated from a multicomponent mixture comprising isomeric alkyl benzenes, that benzene can be separated from a mixture comprising a paraffinic hydrocarbon and benzene, and that cyclohexane can be separated from a mixture comprising a paraffinic hydrocarbon and cyclohexane. Other organic chemicals that may be mentioned include pyridines, dimethylphthalates and fatty acids.

It is not intended, however, to limit the invention to organic mixtures, but rather it is applicable to inorganic mixtures as well, and offers a practical method of separating two inorganic compounds between which solvates or hydrates are formed. Examples of inorganic systems to which this invention is applicable are those for the recovery of pure salts, such as ammonium nitrate, and of anhydrous salts from their hydrates.

In certain cases, it may also be desirable to recover the mother liquor separated from the crystals as a product of the process. This situation arises where it is desired to increase the concentration of a dilute solution. This aspect of the invention is especially applicable to the production of concentrated food products which involves primarily the removal of water from these products. Accordingly, by utilizing the process of this invention, water can be removed from fruit juices such as grape, orange, lemon, pineapple, apple and tomato. It is also possible to concentrate vegetable juices and beverages such as milk, beer, wine, coffee and tea by this method. This aspect of this invention is in general applicable in those instances where it is desired to increase the concentration of a solution by removing at least a portion of the solvent therefrom.

Any methods and apparatus known in the art can be used to effect crystallization and purification of the crystals in carrying out this invention. One well-known method, as disclosed in U.S. Patent No. 2,617,274, involves cooling a liquid multicomponent mixture from which the separation is to be made so as to form crystals of at least the higher melting component and thereafter separating the crystals from the mother liquor. The crystals are then introduced into a purification column in one end of which a melting section is maintained. By mechanical means, the crystals are moved in a compact, continuous mass toward the melting section in the purification column where the crystals are melted. A portion of the melt is withdrawn as the product while the remainder is forced countercurrently to the movement of the crystals and in intimate contact therewith so as to remove therefrom the occluded impurities. Movement of crystals through the purification zone can be effected by any suitable means, such as by a piston, auger, or the like.

It is believed that the method and apparatus of this invention can best be understood by describing it in conjunction with a specific apparatus, such as set out in the accompanying drawing, which is a diagrammatic illustration in cross-section of a three-stage crystallization and purification system having associated therewith surge tanks and instrumentation suitable for carrying out the invention.

Referring to the drawing, a feed material comprising a mixtures of 2-methyl-5-ethylpyridine (MEP) and 2-methyl-5-vinylpyridine (MVP), from which the latter material is to be recovered, is introduced through conduit 2 to feed surge tank 4. This material is joined in the feed surge tank by a recycle stream from purification column 78 also containing a mixture of MEP and MVP. The total feed material is removed from the surge tank through conduit 6 and pump 8, cooled in exchanger 10, and passed through conduit 11 to chiller 12 wherein the first stage of the crystallization and purification operation is commenced. As the feed material passes through chiller 12, the temperature therein is lowered to the point where a portion of this material crystallizes from solution. The crystals form a slurry which passes from the chiller through conduit 14 and into purification column 16. In as much as the crystals tend to form on the inner surface of the chiller it is desirable to provide some type of scraping mechanism which continuously removes the crystals and prevents plugging of the chiller. Purification column 16 comprises a vertical cylindrical member containing in its upper end a reciprocating piston 18, in the middle section a filter 20, and in the bottom end portion a heating element 22. In addition, conduit means 23 and 24 are provided for withdrawing mother liquor from the filter section and product from the bottom end of the column. The feed slurry of crystals from chiller 12 is introduced to column 16 at a point upstream with respect to slurry flow of filter section 20. Usually the column is designed so that feed enters during the back stroke of the piston. As the piston passes downwardly through the purification column the slurry is compressed and passed through filter section 20, mother liquor being removed through conduit 28. The compressed crystals further descend through the column, come in contact with heating element 22, are melted and liquid is removed through conduit 24. The rate of removal of the melt is controlled so that a portion of the melted crystals is forced upwardly from the melting section through the descending crystals as reflux. Displaced mother liquor is withdrawn from the filter section through conduit 28 along with mother liquid separated during compression of the crystal slurry. The melt leaving the bottom of the purification column is concentrated in MVP and comprises the desired product. This material passes from the purification column through conduits 56 and 94 and to receiver 96, from which it is removed through pump 98 and yielded from the unit through conduit 100.

The mother liquor in conduit 28, which contains a lower percentage of MVP than the feed to the purification column, is introduced to pump 36 and from there passes through conduit 38 to a second chiller 40. Surge tank 30 which is in open communication with conduit 28 through conduit 34 is provided to assure a continuous flow of material to chiller 40 in the event of minor interruptions in the operation of chiller 12, purification column 16, etc. Associated with chiller 40 is a second purification column 44. The feed material to chiller 40 is reduced in temperature as in chiller 12 to produce a slurry of crystals which is passed from the chiller through conduit 42 to purification column 44. In the latter column compression, filtration, and melting are again carried out, with a MVP rich stream being withdrawn from the bottom of the purification column through conduit 52 and a MEP rich stream being withdrawn from the filter section through conduit 58. The material from conduit 52 is combined with the melt from purification column 16 and forms a portion of the MVP rich product yielded through conduit 100. The MEP rich stream is introduced from conduit 58 to a third crystallization and purification stage comprising surge tank 66, chiller 74 and purification column 78 wherein operations similar to those previously described are carried out to provide additional streams rich in MVP and MEP. The latter stage being the last of the three stages, the MVP rich stream is usually not of sufficient purity to be added to the MVP product, therefore, this material is recycled to feed tank 4 through conduits 90 and 94. The MEP rich stream leaving purification column 78 through conduit 84 is passed through exchanger 10 in indirect heat exchange with the feed to the first crystallization and purification stage and is then yielded from the unit through conduit 88.

The foregoing discussion and description illustrates the sequence of steps in the normal operation of a multistage crystallization and purification treatment. During such an operation the material present in the feed surge tank and surge tanks 30 and 66 is sufficient to compensate for minor changes in flow and minor interruptions in flow due to temporary equipment difficulties. However, as sometimes happens, due to equipment failure, a feed or yield stream is interrupted for a period of time which exceeds the reserve capacity of the various surge tanks. To illustrate by example, assume that feed pump 70 and its spare, if any, fail to operate. In this event the third crystallization and purification stage would have to be completely shut down. However, even though this stage becomes inoperative it is desirable that the other stages continue to operate to a sufficient degree so that when pump 70 is repaired no additional time will be required to place the first two stages on stream. With the instrumentation provided as illustrated in the drawing upon failure of pump 70 the first two stages automatically switch from production to total recycle in the following manner. Referring to stage two, upon failure of pump 70 mother liquor from purification column 44 is blocked from chiller 74 and is forced through conduit 64 into surge tank 66. When the level in the surge tank reaches a predetermined maximum level, level controller 23 actuates four control valves 17, 19, 21, and 25, the first two valves being opened and the latter two which are normally open, being closed. The changed valving arrangement allows the mother liquor from column 44 to pass through conduit 60 and to return through the pump suction 36 and rich product leaving the bottom of column 44 to return through valve 17 and conduit 54 also to suction of pump 36. This operation thus places the second crystallization and purification stage on total recycle.

As soon as the second crystallization and purification stage is placed on total recycle, surge tank 30 begins to fill up since mother liquor from the first stage can no longer enter chiller 40. When the level in surge tank 30 reaches a predetermined height control valves 5 and 7 are opened and 9 and 51 are closed by signals transmitted from level controller 13, whereby the yield streams from purification column 16 are recycled to the feed surge tank. In this manner the first crystallization and purification stage is also placed on total recycle. The total recycle operation of the first two stages continues until such time as pump 70 is placed in operation and the material in the various surge tanks is reduced to within normal operating levels. When this occurs high level controls 13 and 23 on the surge tanks 30 and 66 respectively operate to reverse the sequence of valve operation whereby normal operation of the unit is resumed.

In addition to the high level controls, low level controls 3, 15 and 31 are provided on the surge tanks so that each of the stages can be switched from production to total recycle as the levels in the various surge tanks fall below a predetermined minimum. In the case of the low level controls, level control 3 on the feed surge tank 4 controls valves 5, 7, 9, and 51, low level control 15 on surge tank 30 controls valves 17, 19, 21, and 25 and low level control 31 on surge tank 66 controls valves 27, 33, 35, and 37. These level controls operate to open and close the noted valves in a suitable sequence to provide total recycle or production of mother liquor and rich MVP product from each purification column in a manner similar to the high level controls.

Any of the conventional liquid level control valves available commercially can be used to provide the sequence control previously described. Preferably the level control instruments are operated in a narrow sensitivity range so that opening and closing of the various product and recycle valves occurs within predetermined narrow ranges of level within the surge tanks. The recycle and product control valves are also conventional valves, which can be either direct acting or indirect acting depending on the requirements of the installation. Thus, for example, considering product valves 9 and 51 and recycle valves 5 and 7, if the former pair are direct acting it is desirable that the latter pair be indirect acting so that an increase or decrease in air pressure to the valves will cause one pair to open when the other pair closes, and vice versa.

The preceding discussion has been directed to a preferred embodiment of the invention, however, this is not intended in any limiting sense and it is within the scope of the invention to utilize other methods and apparatus for crystallization and purification which are known to those skilled in the art. For example the invention can be employed in a multistage crystallization and purification process in which the feed to one or more of the chillers comprises the crystal melt from the preceding purification step. It is also within the scope of the invention to provide surge capacity for the melt product from each stage, with similar instrumentation for alternating between production and total recycle.

The essence of the invention lies in carrying out the crystallization and purification in multiple stages and providing method and means for automatically switching between production and total recycle when the surge capacity of the system is exceeded. It is an advantage of the invention that only a small amount of surge capacity need be provided between each crystallization and purification stage.

The following example is presented in illustration of a preferred embodiment of the invention as applied to a commercial operation.

*Example*

A mixture of 2-methyl-5-ethylpyridine (MEP) and 2-methyl-5-vinylpyridine (MVP), obtained from the dehydrogenation of MEP, is processed in a three stage crystallization and purification system similar to that previously described to provide a product rich in MVP and a product rich in MEP. This operation is carried out under the following operation conditions:

| | Lb./s.d. |
|---|---|
| Flow rates: | |
| Feed to 1st stage (11) | 19,965 |
| Fresh feed (2) | 17,403 |
| Composition— | |
| MVP, 85.0 wt. percent. | |
| MEP, 15.0 wt. percent. | |
| Recycle from 3rd stage (94) | 2,562 |
| Composition— | |
| MVP, 85.0 wt. percent. | |
| MEP, 15.0 wt. percent. | |
| Feed to 2nd stage (38) | 9,982 |
| Composition— | |
| MVP, 75.0 wt. percent. | |
| MEP, 25.0 wt. percent. | |
| Concentrated MVP product from 1st stage (24) | 9,983 |
| Composition— | |
| MVP, 95.0 wt. percent. | |
| MEP, 5.0 wt. percent. | |
| Feed to 3rd stage (72) | 5,445 |
| Composition— | |
| MVP, 58.3 wt. percent. | |
| MEP, 41.7 wt. percent. | |

| | Lb./s.d. |
|---|---|
| Flow rates—Continued: | |
| Concentrated MVP product from 2nd stage (52) | 4,537 |
| Composition— | |
| MVP, 95.0 wt. percent. | |
| MEP, 5.0 wt. percent. | |
| Concentrated MEP product from 3rd stage (84) | 2,883 |
| Composition— | |
| MVP, 34.6 wt. percent. | |
| MEP, 65.4 wt. percent. | |

| | °F. |
|---|---|
| Temperatures: | |
| Feed to 1st stage (11) | 70 |
| 1st chiller (12) | −8 |
| Concentrated MVP product from 1st stage (24) | 20 |
| Feed to 2nd stage (38) | −5 |
| 2nd chiller (40) | −17 |
| Concentrated MVP product from 2nd stage (52) | 20 |
| Feed to 3rd stage (72) | −15 |
| 3rd chiller (74) | −62 |
| Concentrated MVP product from 3rd stage (84) | 10 |

During the course of the crystallization and purification process failure of feed pump 36, which supplies the second stage, occurs, necessitating a shut down of this stage. Immediately thereafter the level in surge tank 30 begins to increase and the level in surge tank 66 decreases from normal. When the level in tank 30 reaches a predetermined maximum level controller 13 transmits signals to motor valves 5, 7, 9, and 51, opening valves 5 and 7 which are normally closed and closing valves 9 and 51. By this operation the two yield streams from the first crystallization and purification stage are returned to the surge tank which feeds this stage and the first stage is thus placed on total recycle. Blocking of the yield lines from the first stage causes the level in the feed surge tank 4 to increase and the flow of fresh feed material to the unit is halted when this tank becomes filled.

While these changes are taking place a similar operation is underway in the third crystallization and purification stage. When the level in the surge tank feeding this stage reaches a predetermined minimum level controller 31 operates to close valves 35 and 37 and open valves 27 and 33, and place this stage also on total recycle.

The recycle operation of stages 1 and 3 continues until such time as the second stage feed pump is returned to service and surge tanks 30 and 66 are again in normal operation. When this occurs the reverse of the previously described switching operations take place and the first and third stages are automatically returned to production.

Having thus described the invention by providing a specific example thereof it is to be understood that no undue limitations or restrictions are to be drawn by reason thereof and that many variations and modifications are within the scope of the invention.

I claim:

1. A crystallization and purification system for the recovery of a crystallizable material from a liquid multicomponent mixture which comprises in combination stages of alternating crystallizers and purifiers arranged in series, each stage of the series comprising a crystallizer followed by a purifier, within each stage the outlet of each crystallizer communicating with the inlet of each purifier and each purifier containing means for separating crystals from mother liquor, means for introducing a liquid multicomponent mixture to said crystallization and purification system, means for removing a concentrate of the crystallizable material from said purifiers as a first yield stream, means for removing material containing low concentrations of the crystallizable material from said purifiers as a second yield stream, surge tanks following said purifiers adapted to receive said material containing low concentrations of the crystallizable material from said purifiers, means for introducing the contents of each surge tank to the downstream crystallizer following said surge tank, means for recycling said first and second yield streams from each purifier to the crystallizer preceding said purifier, and means for automatically switching the various crystallizer and purifier stages to total recycle of said first and second yield streams from each purifier to the crystallizer preceding said purifier so as to maintain the level in the surge tanks between a predetermined minimum and maximum.

2. A crystallization and purification system for the recovery of a crystallizable material from a liquid multicomponent mixture which comprises in combination stages of alternating crystallizers and purifiers arranged in series, each stage of the series comprising a crystallizer followed by a purifier, within each stage the outlet of each crystallizer communicating with the inlet of each purifier and each purifier containing means for separating crystals from mother liquor, means for introducing a liquid multicomponent mixture to said crystallization and purification system, means for removing a concentrate of the crystallizable material from said purifiers as a first yield stream, means for removing material containing low concentrations of the crystallizable material from said purifiers as a second yield stream, surge tank following said purifiers adapted to receive said material having low concentrations of the crystallizable material, means for introducing the contents of each surge tank in the downstream crystallizer following said surge tank, means for recycling said first and second yield streams from each purifier to the crystallizer preceding said purifier, and means for automatically switching the various crystallizer and purifier stages to total recycle of said first and second yield streams from each purifier to the crystallizer preceding said purifier so as to maintain said level in the surge tanks between a predetermined minimum and maximum, said means for automatically switching comprising means for automatically switching responsive to liquid level measurements in said surge tanks.

3. The apparatus of claim 2 in which the feed mixture is introduced to the first crystallizer in said series.

4. The apparatus of claim 2 in which the feed mixture is introduced to the second crystallizer in said series.

5. The apparatus of claim 2 in which three stages are provided and said second yield stream from the last purifier in said series which is concentrated in the crystallizable material is recycled to the first crystallizer.

References Cited by the Examiner
UNITED STATES PATENTS

| | | | |
|---|---|---|---|
| 2,622,115 | 12/52 | Carney | 23—273 |
| 2,753,120 | 7/56 | Carlson | 137—391 X |
| 2,777,889 | 1/57 | Naumann | 23—273 X |
| 2,800,411 | 7/57 | Church | 62—58 |
| 2,900,334 | 8/59 | Muller | 208—350 |
| 2,931,433 | 4/60 | Mertz | 159—47 |
| 2,977,288 | 3/61 | Cabbage | 23—260 |
| 3,006,908 | 10/61 | Dye | 23—263 X |

NORMAN YUDKOFF, *Primary Examiner.*